United States Patent
Sun

(10) Patent No.: US 10,426,184 B1
(45) Date of Patent: Oct. 1, 2019

(54) SEAWEED MEAL AND METHOD OF MAKING THE SAME

(71) Applicant: NUTRIOMIX, INC., Pasadena, CA (US)

(72) Inventor: Lijun Sun, La Canada Flintridge, CA (US)

(73) Assignee: NUTRIOMIX, INC., Pasadena, CA (US)

( * ) Notice: Subject to any disclaimer, the term of this patent is extended or adjusted under 35 U.S.C. 154(b) by 0 days.

(21) Appl. No.: 16/010,306

(22) Filed: Jun. 15, 2018

Related U.S. Application Data

(60) Provisional application No. 62/668,656, filed on May 8, 2018.

(51) Int. Cl.
*A23L 17/60* (2016.01)
*A23L 5/49* (2016.01)
*A23L 17/00* (2016.01)
*A23P 30/20* (2016.01)

(52) U.S. Cl.
CPC .............. *A23L 17/60* (2016.08); *A23L 5/49* (2016.08); *A23L 17/65* (2016.08); *A23P 30/20* (2016.08); *A23V 2002/00* (2013.01)

(58) Field of Classification Search
CPC .. A23L 17/60; A23L 17/65; A23L 5/49; A23P 30/20
USPC .............................................. 426/7
See application file for complete search history.

(56) References Cited

U.S. PATENT DOCUMENTS

| | | | |
|---|---|---|---|
| 3,197,459 A | 7/1965 | Bonniksen et al. | |
| 4,125,392 A | 11/1978 | Primo | |
| 4,816,278 A | 3/1989 | Sasamoto et al. | |
| 5,496,936 A * | 3/1996 | Thami | C08B 37/0039 536/124 |
| 9,296,985 B2 | 3/2016 | Czartoski et al. | |
| 2005/0020828 A1 | 1/2005 | Therkelsen | |
| 2010/0124774 A1 | 5/2010 | Kim et al. | |
| 2012/0094358 A1 | 4/2012 | Medoff | |
| 2014/0106051 A1 | 4/2014 | Lefevre et al. | |
| 2015/0164125 A1* | 6/2015 | Di Tommaso | A61K 36/02 426/473 |

FOREIGN PATENT DOCUMENTS

| | | |
|---|---|---|
| CN | 1169463 C | 10/2004 |
| CN | 1296390 C | 1/2007 |
| CN | 101012286 A | 8/2007 |
| CN | 101664166 A | 3/2010 |
| CN | 101012286 B | 5/2010 |
| CN | 101828696 A | 9/2010 |
| CN | 101619104 B | 7/2011 |
| CN | 102321191 A | 1/2012 |
| CN | 102471386 A | 5/2012 |
| CN | 102499396 A | 6/2012 |
| CN | 102643882 A | 8/2012 |
| CN | 102726771 A | 10/2012 |
| CN | 101828696 B | 11/2012 |
| CN | 102787519 A | 11/2012 |
| CN | 103734748 A | 4/2014 |
| CN | 103570843 B | 10/2014 |
| CN | 104351810 A | 2/2015 |
| CN | 103385472 B | 3/2015 |
| CN | 104911229 A | 9/2015 |
| CN | 105124608 A | 12/2015 |
| CN | 105506033 A | 4/2016 |
| CN | 106490524 A | 3/2017 |
| CN | 104829753 B | 4/2017 |
| CN | 106674363 A | 5/2017 |
| CN | 107522797 A | 12/2017 |
| CN | 107540757 A | 1/2018 |
| CN | 108850902 A | 11/2018 |
| JP | 4625749 B2 | 2/2011 |
| KR | 1020120093522 A | 8/2012 |
| KR | 101457515 B1 | 10/2014 |
| RU | 2323600 C2 | 5/2008 |
| RU | 2613279 C1 | 3/2017 |
| WO | 02057477 A1 | 7/2002 |
| WO | 2012123422 A2 | 9/2012 |
| WO | 2013033598 A1 | 3/2013 |
| WO | 2015102021 A1 | 7/2015 |

OTHER PUBLICATIONS

CN 104911229—Machine Translation (Year: 2015).*
Bo, X. et al. "Production of agar with low-temperature solubility and high gel strength from Gracilaria by screw extrusion[J]" Transactions of the CSAE, 2013, vol. 29, No. 2, 280-286.
Maehre, H. et al. "Enzymatic Pre-Treatment Increases the Protein Bioaccessibility and Extractability in Dulse (*Palmaria palamata*)" Marine Drugs, 2016, vol. 14, No. 196, 1-10.
Wan, K. et al. "Physicochemical properties of native and twin-screw extruded agar gels" College of Food Science—Northeast Agricultural University, Sep. 19, 2016, 1-29.
Certified English translation of Chinese Patent Application CN104911229A filed on behalf of Jimei University, published Sep. 16, 2015. 13 pages.
CNIPA, Search Report for Chinese Patent Application No. 201810791187.X filed Jul. 18, 2018, dated Sep. 11, 2018. English translation attached. 15 pages.

(Continued)

*Primary Examiner* — Hamid R Badr
(74) *Attorney, Agent, or Firm* — Perkins Coie LLP; Yang Tang

(57) ABSTRACT

Provided are methods of making high quality seaweed meal suitable for food applications. The method comprises the steps of cleaning the fresh, dried, or rehydrated red seaweed, pretreating the red seaweed with alkali, pre-treating the red seaweed with acid, hydrolyzing the red seaweed with cellulase, and drying and grinding the treated red seaweed to obtain the seaweed meal. The seaweed meal produced by the disclosed technology has light color, good flavor and taste, good mouthfeel, high gelling capability, great stability, and ideal smoothness and slipperiness suitable for food applications.

28 Claims, No Drawings

(56) References Cited

OTHER PUBLICATIONS

CNIPA, Search Report for Chinese Patent Application No. 201810792086.4 filed Jul. 18, 2018, dated Sep. 14, 2018. English translation attached. 15 pages.

Yang, G. et al. "Twin Screw Extruder" Food Machinery and Device, China Agriculture Press, 1st Edition, May 2015. p. 398. English translation attached.

CNIPA, Search Report for Chinese Patent Application No. 201810791187.X filed Jul. 18, 2018, dated Sep. 11, 2018. 7 pages.

CNIPA, Search Report for Chinese Patent Application No. 201810792086.4 filed Jul. 18, 2018, dated Sep. 14, 2018. 7 pages.

USPTO, Non-Final Office Action for U.S. Appl. No. 16/010,343, dated Jan. 28, 2019. 17 pages.

WIPO, International Search Report and Written Opinion for International Patent Application No. PCT/US19/31216, dated Jul. 17, 2019. 8 pages.

WIPO, International Search Report and Written Opinion for International Patent Application No. PCT/US19/31218, dated Jul. 22, 2019. 8 pages.

USPTO, Final Office Action for U.S. Appl. No. 16/010,343, dated May 20, 2019. 16 pages.

* cited by examiner

SEAWEED MEAL AND METHOD OF MAKING THE SAME

TECHNICAL FIELD

This disclosure relates to seaweed meal and a method of making the same. The seaweed meal disclosed herein can replace the use of agar. The method and the seaweed meal production can be used in the field of food industry.

BACKGROUND

Agar, also called Kanten in Japan. It is a polysaccharide extracted from red algae such as *Gelidium* and *Gracilaria*, and is one of the most widely used algae colloids. Agar has been used as food for several hundred years in China and Japan. It first appeared in the form of jelly-like block, which form is still available nowadays. After World War II Western countries began to industrialize the production of agar powder. Agar powder was initially used for bacteria culturing, later extended to food, cosmetics and pharmaceutical industries. Agar has unique gel performance and gel stability, and therefore, has a wide range of applications in food industry, as well as in pharmaceutical, cosmetics and biological engineering industries.

Clean Label and disruptive Green have become more and more popular in food industrials, and have been listed in the "Top 10 Innova's 2017 Trends," resulting in strong interests in naturalness and clean label. This trend has been growing globally for the past couple of years and is the new standard in the industry. It provides vast market space development potential for seaweed meal to replace agar in food application.

US Patent Application Publication No. 2015/0164125 describes a method for making seaweed meal, including the steps of harvesting the seaweed from a sea floor; chopping the seaweed; cleaning the seaweed; desiccating the seaweed; grinding the seaweed to a meal; drying the seaweed between the cleaning step and the desiccating step, the drying step is accomplished by a seaweed agitator. U.S. Pat. No. 4,125,392 describes a seaweed filter cake product produced by conditioning raw seaweed by mixing it with water and other substances, and then digesting the conditioned seaweed by cooking it with steam to form a steam-digested mixture. The filter cake is skimmed off the top of the resulting steam-digested mixture and used by itself, or as a starting product for producing fertilizers or plant growth stimulators in liquid or pelletized form.

The prior-art references merely produced a simple seaweed meal or cake products, with poor gelling capability, brown or green color, and strong fishery flavor. These prior-art seaweed products are not suitable for use as gelling agent or stabilizer in food applications to replace agar extracted from red seaweed. Thus, there is a need in the field to produce better quality seaweed meal suitable for food applications.

SUMMARY

In one aspect, provided herein is a method of making a seaweed meal to replace agar in the food industry. The method comprises the steps of cleaning the fresh or dried red seaweed, pretreating the red seaweed with an alkali, pre-treating the red seaweed with an acid, treating the red seaweed with an enzyme such as a cellulase, and drying and grinding the treated red seaweed to obtain the seaweed meal. Optionally, the method comprises a step of bleaching the red seaweed with a bleaching agent before the drying and grinding step. In some embodiments, the bleaching step is carried out before the enzyme treatment step. In some embodiments, the bleaching step is carried out after the enzyme treatment step. The disclosure provides a simple process to produce a seaweed meal with light color, good flavor and taste, good mouthfeel, high gelling capability, great stability, and ideal smoothness and slipperiness suitable for "clean label" food applications.

In a related aspect, provided herein is a seaweed meal produced by the method described above. The seaweed meal produced by the disclosed method can be used in food industry to replace agar as gelling ingredient in, for example, dairy, jelly, pudding applications.

DETAILED DESCRIPTION

Methods for making high quality seaweed meal suitable for food applications are provided herein. The method is a simple process to produce a seaweed meal with desired features such as light color, good flavor and taste, good mouthfeel, high gelling capability, great stability, and ideal smoothness and slipperiness suitable for food applications. The seaweed meal produced by the disclosed method can be used in food industry to replace agar as a gelling agent in, for example, producing dairy, jelly, pudding products.

In some embodiments, the method disclosed herein comprises the steps of cleaning seaweed material with water, pre-treating the clean seaweed material with an alkali, pre-treating the alkali-treated seaweed material with an acid, bleaching the pre-treated seaweed material with a bleaching agent, and treating the bleached seaweed material with an enzyme to obtain a seaweed meal suitable for food applications. The bleaching step is optional and can be included if a light color seaweed meal is desired. In some embodiments, the method further comprises the step of processing the enzyme-treated seaweed by twin Screw Extruded process, and then crushing and drying the extruded seaweed.

Seaweed is also called macroalgae, marine algae, or seagrass. The seaweed material used for the disclosed method includes red algae, for example, *Gracilaria, Gelidium, Porphyra*, and *Ahnfeltia*. In some embodiments, a combination of at least two, at least three, or at least four of the disclosed red algae can be used. The seaweed material is cleaned by water prior to any treatment. Seaweed materials in any form such as dry seaweed, fresh seaweed, or rehydrated seaweed, can be used. It is known in the art that fresh seaweed can be dehydrated to obtain dry seaweed. The dry seaweed can be rehydrated by soaking the dry seaweed in water. In some embodiments, the dry seaweed is rehydrated during the cleaning step. When dry seaweed is used, the dry seaweed:water ratio in the cleaning step can be between 1:1 and 1:40, between 1:3 and 1:30, between 1:5 and 1:25, between 1:5 and 1:20, between 1:10 and 1:20, or between 1:5 and 1:10; when fresh seaweed or rehydrated seaweed is used, the fresh seaweed:water ratio in the cleaning step can be between 1:1 and 1:3, between 1:1 and 1:5, between 1:2 and 1:5, between 1:1 and 1:10, or between 1:1 and 1:15.

The alkali that can be used for the disclosed method includes sodium hydroxide, potassium hydroxide, calcium hydroxide, or a combination of these alkalis. The alkalis in one or several forms (e.g. various hydrates) can be used in this disclosure. In the pre-treatment step, the seaweed:alkali ratio can be between 1:1 and 1:3, between 1:1 and 1:5, between 1:2 and 1:5, or between 1:1 and 1:10. The alkali solution can be at a concentration of between 1% and 10%, between 3% and 15%, between 5% and 15%, between 5% and 10%, between 10% and 20%, between 3% and 20%, or between 10% and 30% (wt %). In some embodiments, the alkali pre-treatment step is performed at a temperature between 40° C. and 80° C., between 65° C. and 95° C., between 50° C. and 100° C., or between 70° C. and 120° C. In some embodiments, the alkali pre-treatment can be performed for a period of between 0.5 hour and 24 hours, between 0.5 hour and 20 hours, between 0.5 hour and 15 hours, between 0.5 hour and 12 hours, between 0.5 hour and 8 hours, between 0.5 hour and 6 hours, between 1 hour and 4 hours, between 1.5 hours and 3 hours, or between 0.5 hour and 4 hours.

The acid that can be used for the disclosed method includes hydrochloric acid, nitric acid, phosphate acid, and oxalic acid. Alternatively, a combination of the disclosed acids, such as a combination of at least two acids, at least three acids, or at least four acids, can be used. In the pre-treatment step, the seaweed:acid ratio can be between 1:1 and 1:3, between 1:1 and 1:5, between 1:2 and 1:5, or between 1:1 and 1:10. The acid solution can be at a concentration of between 0.05% and 5%, between 0.1% and 3%, between 0.1% and 2%, between 0.1% and 1%, or between 0.1% and 0.5% (wt %). In some embodiments, the acid pre-treatment step can be performed for a period of between 5 minutes and 240 minutes, between 10 minutes and 180 minutes, between 10 minutes and 120 minutes, between 10 minutes and 60 minutes, or between 20 minutes and 60 minutes.

Optionally, the seaweed is treated with a bleaching agent to obtain a light color seaweed meal. The bleaching agent that can be used for the disclosed method includes hypochlorous acid, sodium hypochlorous, and chlorine dioxide. Alternatively, a combination of the disclosed bleaching agents, such as a combination of at least two bleaching agents, or at least three bleaching agents, can be used. In the bleaching step, the seaweed:bleaching agent ratio can be between 1:1 and 1:3, between 1:1 and 1:5, between 1:2 and 1:5, or between 1:1 and 1:10. The bleaching agent can be at a concentration of available chlorine content of between 0.01% and 5%, between 0.02% and 3%, between 0.05% and 2%, between 0.05% and 1%, or between 0.05% and 0.5% (wt %). In some embodiments, the bleaching step can be performed for a period of between 5 minutes and 240 minutes, between 10 minutes and 180 minutes, between 10 minutes and 120 minutes, between 10 minutes and 60 minutes, or between 20 minutes and 60 minutes.

In some embodiments, the pre-treated or bleached seaweed has an impurity of the red seaweed of less than 5%, less than 4%, less than 3%, less than 2%, or less than 1%, a sulfate content of less than 3%, less than 2%, less than 1%, or less than 0.5%, and a color of light brown to light yellow.

The enzyme treatment catalyzes the hydrolysis of the cellulose and/or related polysaccharides or the like in the pre-treated and/or bleached seaweed such that the obtained seaweed meal has an improved mouthfeel. Various enzymes may be used to achieve this goal, for example, cellulase, hemicellulose, pectinase, amylase, xylanase, pentosanase, glucanase, esterase. In some embodiments, one or more enzymes can be used to treat the seaweed. An example of the suitable enzyme is cellulase, including acid cellulase, neutral cellulase, and alkali cellulase, including but not limited to 1,4-β-D-glucan glucanohydrolase, endo-1,4-β-D-glucanase, 1,4-β-D-glucan cellobilhydrolase, exo-1,4-β-D-glucannase, β-1,4-glucosidase, from *Trichoderma, Aspergillus* or *Penicillium*. In some embodiments, a combination of at least two, at least three, or more of these cellulases can be used. In the enzyme treatment step, the seaweed:enzyme ratio can be between 1:1 and 1:3, between 1:1 and 1:5, between 1:2 and 1:5, or between 1:1 and 1:10. The enzyme can be at a concentration of between 10 U/g and 500 U/g, between 20 U/g and 400 U/g, between 30 U/g and 300 U/g, between 50 U/g and 200 U/g, or between 75 U/g and 150 U/g. In some embodiments, the enzyme treatment step can be performed for a period of between 0.5 hour and 12 hours, between 0.5 hour and 8 hours, between 0.5 hour and 6 hours, between 1 hour and 3 hours, or between 1 hour and 4 hours, at a pH range of between 2.0 and 10.0, between 3.0 and 9.0, between 3.0 and 8.0, between 4.0 and 7.0, or between 5.0 and 6.0, or at a temperature between 15° C. and 100° C., between 20° C. and 90° C., between 30° C. and 80° C., between 20° C. and 70° C., between 30° C. and 60° C., or between 40° C. and 50° C.

A variety of acids or alkalis can be used to adjust pH. For example, the alkali for pH adjustment is selected from the group consisting of sodium hydroxide, potassium hydroxide, and a combination thereof. The acid for pH adjustment is selected from the group consisting of hydrochloric acid, nitric acid, phosphate acid, and a combination of at least two, or at least three of these acids.

Optionally, the method disclosed herein further includes processing the enzyme treated seaweed with a twin Screw Extruded process, which can be performed at a temperature between 70° C. and 200° C., between 80° C. and 150° C., between 100° C. and 150° C., between 100° C. and 140° C., between 120° C. and 140° C., or between 110° C. and 130° C. The twin Screw Extruded process can be performed in the absence or in the presence of water. For example, the seaweed:water ratio can be between 1:0 and 1:5, between 1:1 and 1:3, or between 1:0 to 1:2.

In some embodiments, the clean seaweed is pretreated with 5%-15% (wt %) of an alkali solution at a ratio of between 1:2 and 1:5 and at a temperature of between 65° C. and 95° C., pretreated with 0.1%-0.5% (wt %) of an acid solution at a ratio of between 1:2 and 1:5, treated with a cellulase having a concentration of between 75 U/g and 250 U/g at a ratio of between 1:2 and 1:5 and at a temperature of between 40° C. and 60° C., and then treated with a twin Screw Extruded process at a temperature between 110° C. and 140° C.

The enzyme treated seaweed or the twin Screw Extruded processed seaweed can be crushed and dried to obtain the seaweed meal. In some embodiments, the dried seaweed meal has a water gel strength of at least 50 g/cm$^2$, at least 75 g/cm$^2$, at least 100 g/cm$^2$, at least 120 g/cm$^2$, or at least 150 g/cm$^2$. In some embodiments, the dried seaweed meal has a color of light brown to light yellow. In some embodiments, the dried seaweed meal has a dissolving temperature of less than 100° C., less than 90° C., less than 85° C., less than 75° C., or less than 60° C.

The following examples are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

EXAMPLES

Example 1: Materials and Methods

The algae materials used in the experiments are as follows:

Table 1

| Algae Materials | | |
|---|---|---|
| Algae Materials | Purity | Moisture Content |
| Dried *Gracilaria* | 95% | 18% |
| Fresh *Gracilaria* | 97% | 82% |
| Dried *Gelidium* | 94% | 17% |
| Dried *Porphyra* | 98% | 19% |
| Dried *Ahnfeltia* | 93% | 19% |

Other reagents include: hypochlorous acid, sodium hypochlorous, available chlorine contents 10%, food grade; chlorine dioxide, available chlorine contents 50%, food grade; sodium hydroxide, potassium hydroxide, calcium hydroxide, 99% food grade; hydrochloric acid, 36%, food grade; and sulfuric acid, nitric acid, oxalic acid, phosphate acid, 99%, food grade; acid cellulase, neutral cellulose, alkaline cellulose, 50,000 U/g, food grade. HAAKE Process 11Parallel Twin Screw Extruder was used in certain processes.

Example 2: Preparation of Seaweed Meal from Dried *Gracilaria*

10 kg dried *Gracilaria* was mixed with 50 kg water in the tank, stirred at 60 RPM for 30 minutes to clean the seaweed, and then the water was removed to obtain 50 kg clean seaweed. The clean seaweed was mixed with 50 kg 3% sodium hydroxide solution in the reaction tank, the mixture was heated and the temperature was kept at 50° C., with stirring at 60 RPM for 30 minutes, followed by washing the seaweed with 500 kg water. Once the water was removed, 48 kg of alkali pre-treated seaweed was obtained. The alkali pre-treated seaweed was mixed with 50 kg of 0.1% hydrochloric acid solution in the tank, stirred for 10 minutes, washed by 100 kg water, and then the water was removed to obtain 46 kg acid pre-treated seaweed. The pre-treated seaweed was mixed with 50 kg 0.05% bleaching agent, hypochlorous acid (HClO) solution, stirred at 60 RPM for 10 minutes, then the hypochlorous acid solution was removed, and the seaweed was washed with 100 kg water. Once the water was removed 46 kg pre-treated seaweed was obtained. The specification of the pre-treated seaweed was: impurity of the red seaweed ≤0.5%, the sulfate content of the seaweed ≤0.3%, and the color was yellow.

Subsequently, the pre-treated seaweed was mixed with 46 kg of 30 U/g acid cellulase solution, pH was adjusted to 3.0 using hydrochloric acid, and the temperature was kept at 20° C., with stirring at 60 RPM for 30 minutes. Then the cellulase solution was removed and the seaweed was washed with 100 kg water. 40 kg cellulase treated seaweed was obtained.

The seaweed was processed by HAAKE Process 11Parallel Twin Screw Extruder with a heating temperature set at 100° C. And then the extruded seaweed was crushed and dried to obtain 3.5 kg seaweed meal.

Example 3: Preparation of Seaweed Meal from Fresh *Gracilaria*

50 kg fresh *Gracilaria* was mixed with 150 kg water in the tank, and stirred at 60 RPM for 30 minutes to clean the seaweed. The water was removed to obtain 49 kg clean seaweed. The clean seaweed was mixed with 120 kg of 6% sodium hydroxide solution in the reaction tank. The mixture was heated and the temperature was kept at 85° C., with stirring at 60 RPM for 120 minutes. The seaweed was washed with 600 kg water, and the water was removed to obtain 48 kg alkali pre-treated seaweed. The alkali pre-treated seaweed was mixed with 120 kg of 0.38% phosphate acid solution in the tank and stirred for 30 minutes, and then washed with 100 kg water. The water was removed to obtain 48 kg acid pre-treated seaweed. The acid pre-treated seaweed was mixed with 120 kg 0.1% bleaching agent, sodium hypochlorous acid solution, stirred at 60 RPM for 30 minutes, the sodium hypochlorous acid solution was removed, and followed by washing with 100 kg water. The water was removed to obtain 45 kg pre-treated seaweed. The specification of the pre-treated seaweed was: impurity of the red seaweed ≤0.8%, the sulfate content of the seaweed ≤0.2%, and the color was light yellow.

The pre-treated seaweed was mixed with 120 kg of 100 U/g cellulase solution, pH was adjusted to 5.0 with hydrochloric acid, heated and the temperature was kept at 50° C., with stirring at 60 RPM for 120 minutes. The cellulase solution was removed and the seaweed was washed with 100 kg water. 41 kg of cellulase treated seaweed was obtained.

The treated seaweed was processed by HAAKE Process 11Parallel Twin Screw Extruder with heating temperature set at 128° C. And then the extruded seaweed was crushed and dried to obtain 3.8 kg seaweed meal.

Example 4: Preparation of Seaweed Meal from Dried *Gracilaria*

10 kg dried *Gracilaria* was mixed with 150 kg water in the tank, and stirred at 60 RPM for 30 minutes to clean the seaweed. The water was removed to obtain 50 kg clean seaweed. The clean seaweed was mixed with 250 kg 20% sodium hydroxide solution in the reaction tank. The mixture was heated and kept at a temperature of 100° C., with stirring at 60 RPM for 12 hours. Then the seaweed was washed with 600 kg water. The water was removed to obtain 45 kg alkali pre-treated seaweed. The alkali pre-treated seaweed was mixed with 225 kg 0.5% nitric acid solution in the tank and stirred for 2 hours, and then washed with 100 kg water. The water was removed to obtain 42 kg acid pre-treated seaweed. The acid pre-treated seaweed was mixed with 210 kg 0.5% bleaching agent, sodium hypochlorous acid solution, stirred at 60 RPM for 120 minutes, and then the sodium hypochlorous acid solution was removed, followed by washing with 200 kg water. The water was removed to obtain 42 kg pre-treated seaweed. The specification of the pre-treated seaweed was: impurity of the red seaweed ≤0.4%, the sulfate content of the seaweed ≤0.1%, and the color was light yellow.

The pre-treated seaweed was mixed with 210 kg of 300 U/g neutral cellulase solution, pH was adjusted to 8.0, heated and the temperature was kept at 70° C., with stirring at 60 RPM for 6 hours. The cellulase solution was removed and the seaweed was washed with 200 kg water. 32 kg cellulase treated seaweed was obtained.

The treated seaweed was mixed with 64 kg water and processed by HAAKE Process 11Parallel Twin Screw Extruder with heating temperature set at 140° C. And then the extruded seaweed was crushed and dried to obtain 2.5 kg seaweed meal.

Example 5: Preparation of Seaweed Meal from Dried *Gracilaria*

10 kg dried *Gracilaria* was mixed with 120 kg water in the tank, and stirred at 60 RPM for 30 minutes to clean the seaweed. The water was removed to obtain 50 kg clean seaweed. The clean seaweed was mixed with 150 kg 10% sodium hydroxide solution in the reaction tank. The mixture was heated and kept at a temperature of 90° C., with stirring at 60 RPM for 4 hours, then the seaweed was washed with 600 kg water. The water was removed to obtain 48 kg alkali pre-treated seaweed. The alkali pre-treated seaweed was mixed with 150 kg of 0.4% sulfuric acid solution in the tank and stirred for 1 hour, and washed with 100 kg water. The water was removed to obtain 48 kg acid pre-treated seaweed. The acid pre-treated seaweed was mixed with 150 kg of 0.3% bleaching agent, hypochlorous acid solution, stirred at 60 RPM for 1 hour. And then the sodium hypochlorous acid solution was removed, and the seaweed was washed with 100 kg water. The water was removed to obtain 46 kg pre-treated seaweed. The specification of the pre-treated seaweed was: impurity of the red seaweed ≤0.6%, the sulfate content of the seaweed ≤0.3%, and the color was light yellow.

The pre-treated seaweed was mixed with 150 kg of 200 U/g alkaline cellulase solution, pH was adjusted to 8.0, and heated and kept at 60° C., with stirring at 60 RPM for 4 hours. The cellulase solution was removed and the seaweed was washed with 100 kg water. 42 kg cellulase treated seaweed was obtained.

The treated seaweed was mixed with 42 kg water and processed by HAAKE Process 11Parallel Twin Screw Extruder with heating temperature set at 120° C. And then the extruded seaweed was crushed and dried to obtain 3.5 kg seaweed meal.

Example 6: Preparation of Seaweed Meal from Dried *Gracilaria*

10 kg dried *Gracilaria* was mixed with 150 kg water in the tank, and stirred at 60 RPM for 30 minutes to clean the seaweed. The water was removed to obtain 50 kg clean seaweed. The clean seaweed was mixed with 120 kg of 4% sodium hydroxide solution in the reaction tank. The mixture was heated and kept at a temperature of 85° C., with stirring at 60 RPM for 2 hours, and then washed with 600 kg water. The water was removed to obtain 49 kg alkali pre-treated seaweed. The alkali pre-treated seaweed was mixed with 150 kg of 0.4% sulfuric acid solution in the tank and stirred for 45 minutes, followed by washing with 100 kg water. The water was removed to obtain 46 kg acid pre-treated seaweed. The acid pre-treated seaweed was mixed with 150 kg of 0.3% bleaching agent, chlorine dioxide solution, stirred at 60 RPM for 1 hour. The chlorine dioxide solution was removed, and the seaweed was washed with 100 kg water. The water was removed to obtain 46 kg pre-treated seaweed. The specification of the pre-treated seaweed was: impurity of the red seaweed ≤0.8%, the sulfate content of the seaweed ≤0.4%, and the color was light brown. And then the seaweed was crushed and dried to obtain 4.2 kg seaweed meal.

Example 7: Preparation of Seaweed Meal from *Ahnfeltia*

10 kg *Ahnfeltia* was mixed with 150 kg water in the tank, and stirred at 60 RPM for 30 minutes to clean the seaweed. The water was removed to obtain 49 kg clean seaweed. The clean seaweed was mixed with 120 kg of 5% sodium hydroxide solution in the reaction tank. The mixture was heated and kept at a temperature of 88° C., with stirring at 60 RPM for 120 minutes, and then washed with 500 kg water. The water was removed to obtain 47 kg alkali pre-treated seaweed. The alkali pre-treated seaweed with 120 kg of 0.39% oxalic acid solution in the tank and stirred for 30 minutes, followed by washing with 100 kg water. The water was removed to obtain 48 kg acid pre-treated seaweed. The acid pre-treated seaweed was mixed with 120 kg of 0.15% bleaching agent, hypochlorous acid solution, stirred at 60 RPM for 30 minutes. Then the hypochlorous acid solution was removed, and the seaweed was washed with 100 kg water. The water was removed to obtain 46 kg pre-treated seaweed. The specification of the pre-treated seaweed was: impurity of the red seaweed ≤0.5%, the sulfate content of the seaweed ≤0.3%, and the color was light yellow.

The pre-treated seaweed was mixed with 120 kg of 110 U/g acid cellulase solution, pH adjusted to 4.80 with hydrochloric acid, heated and the temperature was kept at 45° C., with stirring at 60 RPM for 180 minutes. The cellulase solution was removed and the seaweed was washed with 100 kg water. 42 kg cellulase treated seaweed was obtained.

The treated seaweed was processed by HAAKE Process 11Parallel Twin Screw Extruder with heating temperature set at 130° C. And then the extruded seaweed was crushed and dried to obtain 3.6 kg seaweed meal.

Example 8: Preparation of Seaweed Meal from Dried *Gelidium*

10 kg dried *Gelidium* was mixed with 100 kg water in the tank, and stirred at 60 RPM for 30 minutes to clean the seaweed. The water was removed to obtain 50 kg clean seaweed. The clean seaweed was mixed with 100 kg of 5% sodium hydroxide solution in the reaction tank. The mixture was heated and kept at a temperature of 60° C., with stirring at 60 RPM for 6 hours, and then washed with 600 kg water. The water was removed to obtain 49 kg alkali pre-treated seaweed. The alkali pre-treated seaweed was mixed with 100 kg of 0.2% phosphate acid in the tank and stirred for 1 hour, followed by washing with 100 kg water. The water was removed to obtain 48 kg acid pre-treated seaweed. The acid pre-treated seaweed was mixed with 150 kg of 0.06% bleaching agent, sodium hypochlorous acid solution, and stirred at 60 RPM for 1 hour. The sodium hypochlorous acid solution was removed, and the seaweed was washed with 100 kg water. The water was removed to obtain 46 kg pre-treated seaweed. The specification of the pre-treated seaweed was: impurity of the red seaweed ≤0.5%, the sulfate content of the seaweed ≤0.4%, and the color was light brown.

The pre-treated seaweed was mixed with 150 kg of 80 U/g acid cellulase solution, pH was adjusted to 5.5, heated and the temperature was kept at 40° C., with stirring at 60 RPM for 1.5 hours. The cellulase solution was removed and the seaweed was washed with 100 kg water. 43 kg cellulase treated seaweed was obtained.

The treated seaweed was mixed with 43 kg water and processed by HAAKE Process 11Parallel Twin Screw Extruder with heating temperature set at 115° C. And then the extruded seaweed was crushed and dried to obtain 3.2 kg seaweed meal.

Example 9: Preparation of Seaweed Meal from Dried *Porphyra*

10 kg dried *Porphyra* was mixed with 150 kg water in the tank, and stirred at 60 RPM for 30 minutes to clean the seaweed. The water was removed to obtain 50 kg clean seaweed. The clean seaweed was mixed with 200 kg of 15% calcium hydroxide solution in the reaction tank, heated and kept at a temperature of 90° C., with stirring at 60 RPM for 6 hours, and then washed with 500 kg water. The water was removed to obtain 50 kg alkali pre-treated seaweed. The alkali pre-treated seaweed was mixed with 150 kg of 0.4% phosphate acid in the tank and stirred for 45 minutes, followed by washing with 150 kg water. The water was removed to obtain 49 kg acid pre-treated seaweed. The acid pre-treated seaweed was mixed with 150 kg of 0.25% bleaching agent, sodium hypochlorous acid solution, stirred at 60 RPM for 45 minutes, and then the sodium hypochlorous acid solution was removed, and washed with 100 kg water. The water was removed to obtain 48 kg pre-treated seaweed. The specification of the pre-treated seaweed was: impurity of the red seaweed ≤0.4%, the sulfate content of the seaweed ≤0.5%, and the color was light yellow.

The pre-treated seaweed was mixed with 150 kg of 220 U/g acid cellulase solution, pH was adjusted to 6.0, heated and the temperature was kept at 60° C., with stirring at 60 RPM for 1.5 hours. The cellulase solution was removed and the seaweed was washed with 100 kg water. 46 kg cellulase treated seaweed was obtained.

The treated seaweed was mixed with 46 kg water and processed by HAAKE Process 11Parallel Twin Screw Extruder with heating temperature set at 135° C. And then the extruded seaweed was crushed and dried to obtain 3.8 kg seaweed meal.

Example 10: Basic Analysis of the Seaweed Meal Preparations

Table 2 summarizes the treatment of Examples 2-9 to obtain various seaweed meal preparations.

TABLE 2

Seaweed Meal Preparations

| Sample No. | Example No. | Seaweed Type | Alkali, acid, bleaching agent | Enzyme | Extruded |
|---|---|---|---|---|---|
| 1 | 2 | Dried Gracilaria | NaOH 3%, HCl 0.1%, HClO 0.05% | Acid cellulase 30 U/g | 100° C., seaweed: water = 1:0 |
| 2 | 3 | Fresh Gracilaria | NaOH 6%, H$_3$Po$_4$ 0.375%, NaClO 0.1% | Acid cellulase 100 U/g | 130° C., seaweed: water = 1:0 |
| 3 | 4 | Dried Gracilaria | NaOH 20%, HNO$_3$ 0.5%, NaClO 0.5% | Neutral cellulase 300 U/g | 140° C., seaweed: water = 1:2 |
| 4 | 5 | Dried Gracilaria | NaOH 10%, H$_2$SO$_4$ 0.4%, NaClO 0.2% | Alkaline cellulase 200 U/g | 120° C., seaweed: water = 1:1 |
| 5 | 6 | Dried Gracilaria | NaOH 4%, H$_2$SO$_4$ 0.4%, ClO$_2$ 0.3% | No treatment | No treatment |
| 6 | 7 | Dried Ahnfeltia | NaOH 5%, oxalic acid 0.4%, HClO 0.15% | Acid cellulase 110 U/g | 130° C., seaweed: water = 1:0 |
| 7 | 8 | Dried Gelidium | NaOH 5%, H$_3$PO$_4$ 0.2%, NaClO 0.06% | Acid cellulase 80 U/g | 115° C., seaweed: water = 1:1 |

TABLE 2-continued

Seaweed Meal Preparations

| Sample No. | Example No. | Seaweed Type | Alkali, acid, bleaching agent | Enzyme | Extruded |
|---|---|---|---|---|---|
| 8 | 9 | Dried Porphyra | Ca(OH)$_2$ 15%, H$_3$PO$_4$ 0.4%, NaClO 0.25% | Acid cellulase 220 U/g | 135° C., seaweed: water = 1:1 |

The gel strength measurement was performed as follows: 3.0 g of dry seaweed meal was mixed with 197 g of distilled water in a pre-weighed beaker. The mixture was heated to 90° C., with stirring slowly using a spoon, while placed in a 90° C. water bath for 30 minutes until the seaweed meal was dissolved in the distilled water. The water jelly was allowed to cool for 3 hours at room temperature. The beaker containing the jelly was transferred to a 20° C. constant temperature box and stored for at least 20 hours before the gel strength measurement. The gel strength was tested by TXAT2i (Texture Analyser).

The dissolving temperature and the gelling temperature measurement was performed as follows: 2 g of sample was mixed in 200 ml deionized water, the gelling and dissolving temperature was measured by Anton Paar MCR 301 rheometer, with the following parameters:
1. Heating ramp: 2° C./min, 0.4 Hz, 1%;
2. Stabilization: 15 min, 0.4 Hz, 1%;
3. Cooling ramp: 2° C./min, 0.4 Hz, 1%; and
4. Stabilization: 15 min, 0.4 Hz, 1%.

The yogurt test was performed as follows: The seaweed meal was mixed in water and heated to 50-55° C. The milk powder was added to the mixture and stirred for 30 minutes while maintained at 50-55° C. Dextrose was added and stirred for 5 minutes. The mixture was homogenized at 65-70° C., 180-200 bar, and then kept at 90-95° C. for 3.5 hours. Later it was cooled down to 37° C., culture added and fermented at 37° C. The yogurt was cooled down in a refrigerator at 4° C.

The sulfate test was performed as follows: 100 mg sample was dissolved in 20 ml of water (with heating if necessary), and 3 ml of barium chloride test solution and 5 ml of hydrochloric acid were added. The test solution was diluted and filtered if a precipitate formed. The solution or the filtrate was boiled for 5 minutes. A white, crystalline precipitate appeared.

Table 3 summaries the results of the basic analysis of the seaweed meal preparation samples 1-8, obtained from Examples 2-9.

TABLE 3

Results of Seaweed Meal Analysis

| Sample No. | Yield | Gel strength g/cm$^2$ | Color | Dissolving Temp (° C.) | Texture in yogurt application |
|---|---|---|---|---|---|
| 1 | 35% | 118 | Light yellow | 80 | More smoothness, less roughness |
| 2 | 38% | 398 | Light yellow | 60 | Smoothness |
| 3 | 25% | 490 | Light yellow | 62 | roughness |
| 4 | 35% | 258 | Light yellow | 78 | More smoothness, less roughness |
| 5 | 42% | 185 | yellow | 95 | More smoothness, less roughness |
| 6 | 36% | 410 | Light yellow | 61 | smoothness |

TABLE 3-continued

Results of Seaweed Meal Analysis

| Sample No. | Yield | Gel strength g/cm² | Color | Dissolving Temp (° C.) | Texture in yogurt application |
|---|---|---|---|---|---|
| 7 | 32% | 218 | Light brown | 82 | More smoothness, less roughness |
| 8 | 38% | 220 | Light yellow | 61 | More smoothness, less roughness |

Samples 2 and 6 produced the best results in various tests. Samples 4, 7 and 8 also produced acceptable results in various tests.

The invention claimed is:

1. A method of preparing a high quality seaweed meal suitable for food applications, consisting of:
   cleaning seaweed material with water, wherein the seaweed material is dry, fresh, or rehydrated seaweed material;
   pre-treating the seaweed with an alkali;
   pre-treating the seaweed with an acid; and
   treating the pre-treated seaweed with a cellulase, thereby to obtain the seaweed meal.

2. A method of preparing a high quality seaweed meal suitable for food applications, consisting of:
   cleaning seaweed material with water, wherein the seaweed material is dry, fresh, or rehydrated seaweed material;
   pre-treating the seaweed with an alkali;
   pre-treating the seaweed with an acid;
   treating the pre-treated seaweed with a cellulase, and
   bleaching the seaweed with a bleaching agent before or after the step of cellulase treatment, thereby to obtain the seaweed meal.

3. The method of claim 2, wherein the bleaching step is performed with a seaweed:bleaching solution ratio of between 1:1 and 1:3, between 1:1 and 1:5, between 1:2 and 1:5, or between 1:1 and 1:10.

4. The method of claim 2, wherein the bleaching step is performed with a concentration of available chlorine content of between 0.01% and 5%, between 0.02% and 3%, between 0.05% and 2%, between 0.05% and 1%, or between 0.05% and 0.5% (wt %).

5. The method of claim 2, wherein the bleaching step is performed for a period of between 5 minutes and 240 minutes, between 10 minutes and 180 minutes, between 10 minutes and 120 minutes, between 10 minutes and 60 minutes, or between 20 minutes and 60 minutes.

6. The method of claim 2, wherein the bleaching agent is selected from the group consisting of hypochlorous acid, sodium hypochlorous, chlorine dioxide, and a combination thereof.

7. A method of preparing a high quality seaweed meal suitable for food applications, consisting of:
   cleaning seaweed material with water, wherein the seaweed material is dry, fresh, or rehydrated seaweed material;
   pre-treating the seaweed with an alkali;
   pre-treating the seaweed with an acid;
   treating the pre-treated seaweed with a cellulase,
   processing the treated seaweed material by twin Screw Extruded process, and
   crushing and drying the extruded seaweed, thereby to obtain the seaweed meal.

8. The method of claim 7, wherein the twin Screw Extruded process is performed at a temperature between 70° C. and 200° C., between 80° C. and 150° C., between 100° C. and 150° C., between 100° C. and 140° C., or between 110° C. and 130° C.

9. The method of claim 7, wherein the twin Screw Extruded process is performed at a seaweed:water ratio between 1:0 and 1:5, between 1:1 and 1:3, or between 1:0 to 1:2.

10. The method of claim 1, wherein the pre-treated seaweed has an impurity of the red seaweed of less than 1%, a sulfate content of less than 0.5%, and a color of light brown to light yellow.

11. The method of claim 1, wherein the seaweed material is red algae.

12. The method of claim 1, wherein the seaweed material comprises *Gracilaria, Gelidium, Porphyra, Ahnfeltia* or a combination thereof.

13. The method of claim 1, wherein the cleaning step is performed with a fresh seaweed:water ratio of between 1:1 and 1:3, between 1:1 and 1:5, between 1:2 and 1:5, between 1:1 and 1:10, or between 1:1 and 1:15 or a dry seaweed:water ratio of between 1:1 and 1:40, between 1:3 and 1:30, between 1:5 and 1:25, between 1:5 and 1:20, between 1:10 and 1:20, or between 1:5 and 1:10.

14. The method of claim 1, wherein the alkali pre-treatment step is performed with a seaweed:alkali solution ratio of between 1:1 and 1:3, between 1:1 and 1:5, between 1:2 and 1:5, or between 1:1 and 1:10.

15. The method of claim 1, wherein the alkali pre-treatment step is performed with a concentration of alkali solution between 1% and 10%, between 3% and 15%, between 5% and 15%, between 10% and 20%, between 3% and 20%, or between 10% and 30% (wt %).

16. The method of claim 1, wherein the alkali pre-treatment step is performed at a temperature between 40° C. and 80° C., between 65° C. and 95° C., between 50° C. and 100° C., or between 70° C. and 120° C.

17. The method of claim 1, wherein the alkali pre-treatment step is performed for a period of between 0.5 hour and 24 hours, between 0.5 hour and 20 hours, between 0.5 hour and 15 hours, between 0.5 hour and 12 hours, between 0.5 hour and 8 hours, between 0.5 hour and 6 hours, between 1 hour and 4 hours, between 1.5 hours and 3 hours, or between 0.5 hour and 4 hours.

18. The method of claim 1, wherein the acid pre-treatment step is performed with a seaweed:acid solution ratio of between 1:1 and 1:3, between 1:1 and 1:5, between 1:2 and 1:5, or between 1:1 and 1:10.

19. The method of claim 1, wherein the acid pre-treatment step is performed with a concentration of acid solution between 0.05% and 5%, between 0.1% and 3%, between 0.1% and 2%, between 0.1% and 1%, or between 0.1% and 0.5% (wt %).

20. The method of claim 1, wherein the acid pre-treatment step is performed for a period of between 5 minutes and 240 minutes, between 10 minutes and 180 minutes, between 10 minutes and 120 minutes, between 10 minutes and 60 minutes, or between 20 minutes and 60 minutes.

21. The method of claim 1, wherein the alkali is selected from the group consisting of sodium hydroxide, potassium hydroxide, and a combination thereof.

22. The method of claim 1, wherein the acid is selected from the group consisting of hydrochloric acid, nitric acid, phosphate acid, oxalic acid, and a combination thereof.

23. The method of claim 1, wherein the cellulase treatment step is performed with a seaweed:cellulase solution ratio of between 1:1 and 1:3, between 1:1 and 1:5, between 1:2 and 1:5, or between 1:1 and 1:10.

24. The method of claim 1, wherein the cellulase treatment step is performed at a pH range of between 2.0 and 10.0, between 3.0 and 9.0, between 3.0 and 8.0, between 4.0 and 7.0, or between 5.0 and 6.0.

25. The method of claim 1, wherein the cellulase treatment step is performed at a concentration of the cellulase between 10 U/g and 500 U/g, between 20 U/g and 400 U/g, between 30 U/g and 300 U/g, between 50 U/g and 200 U/g, or between 75 U/g and 150 U/g.

26. The method of claim 1, wherein the cellulase treatment step is performed at a temperature of between 15° C. and 100° C., between 20° C. and 90° C., between 30° C. and 80° C., between 20° C. and 70° C., between 30° C. and 60° C., or between 40° C. and 50° C.

27. The method of claim 1, wherein the cellulase treatment step is performed for a period of between 0.5 hour and 12 hours, between 0.5 hour and 8 hours, between 0.5 hour and 6 hours, between 1 hour and 3 hours, or between 1 hour and 4 hours.

28. The method of claim 1, wherein the cellulase is selected from the group consisting of acid cellulase, neutral cellulase, alkali cellulase, and a combination thereof.

\* \* \* \* \*